Oct. 12, 1937.  G. T. HORTON  2,095,256
CONTAINER
Filed Oct. 5, 1935    4 Sheets-Sheet 1

Inventor:
George T. Horton,
By Dynrenforth, Lee, Chritton & Wiles,
Attys.

Oct. 12, 1937. G. T. HORTON 2,095,256
CONTAINER
Filed Oct. 5, 1935 4 Sheets-Sheet 2
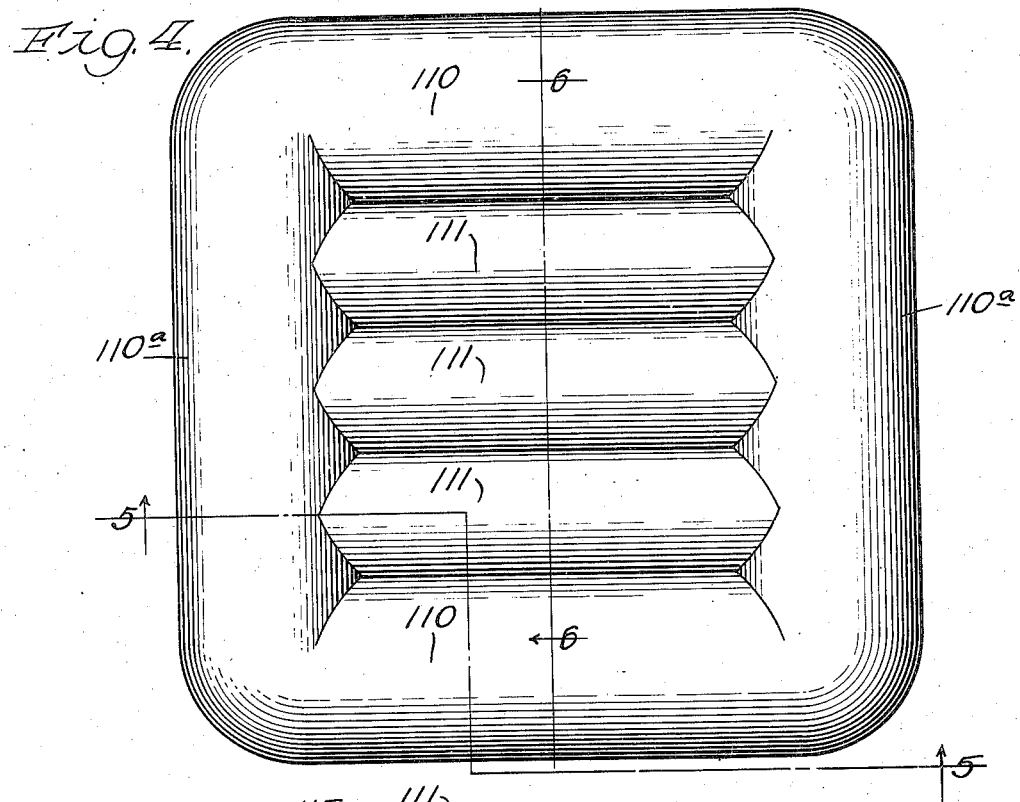
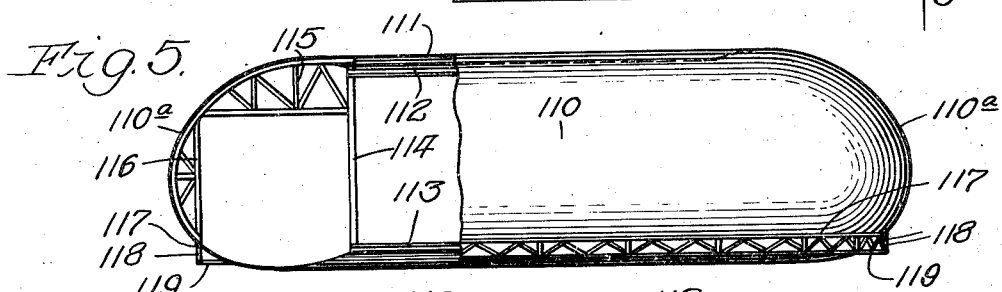
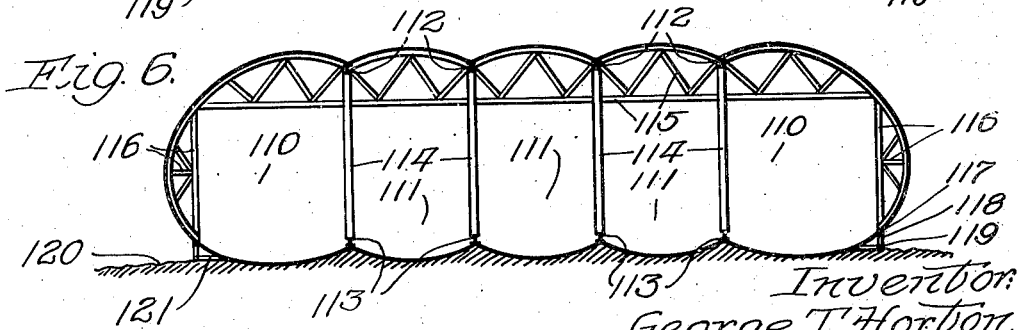

Oct. 12, 1937.  G. T. HORTON  2,095,256
CONTAINER
Filed Oct. 5, 1935    4 Sheets-Sheet 3
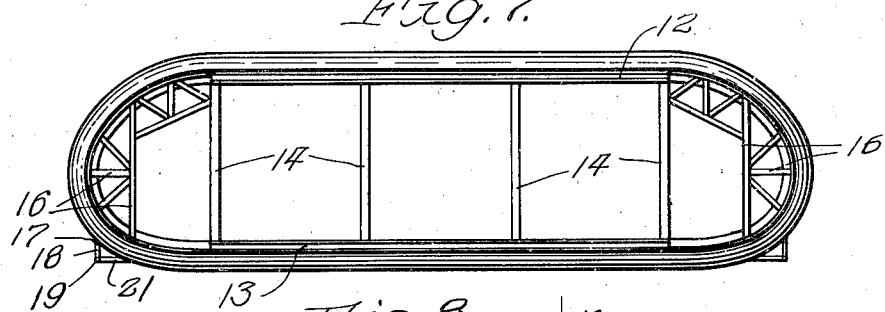
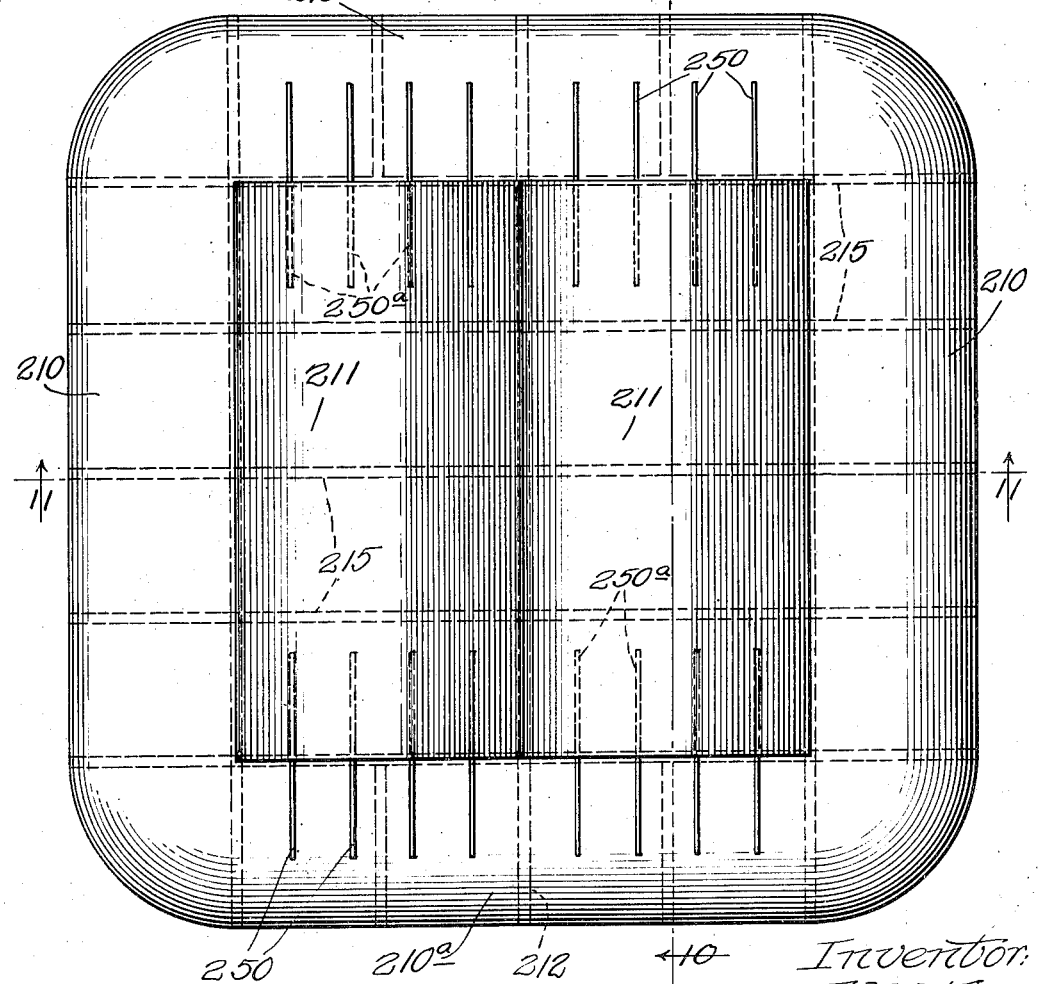

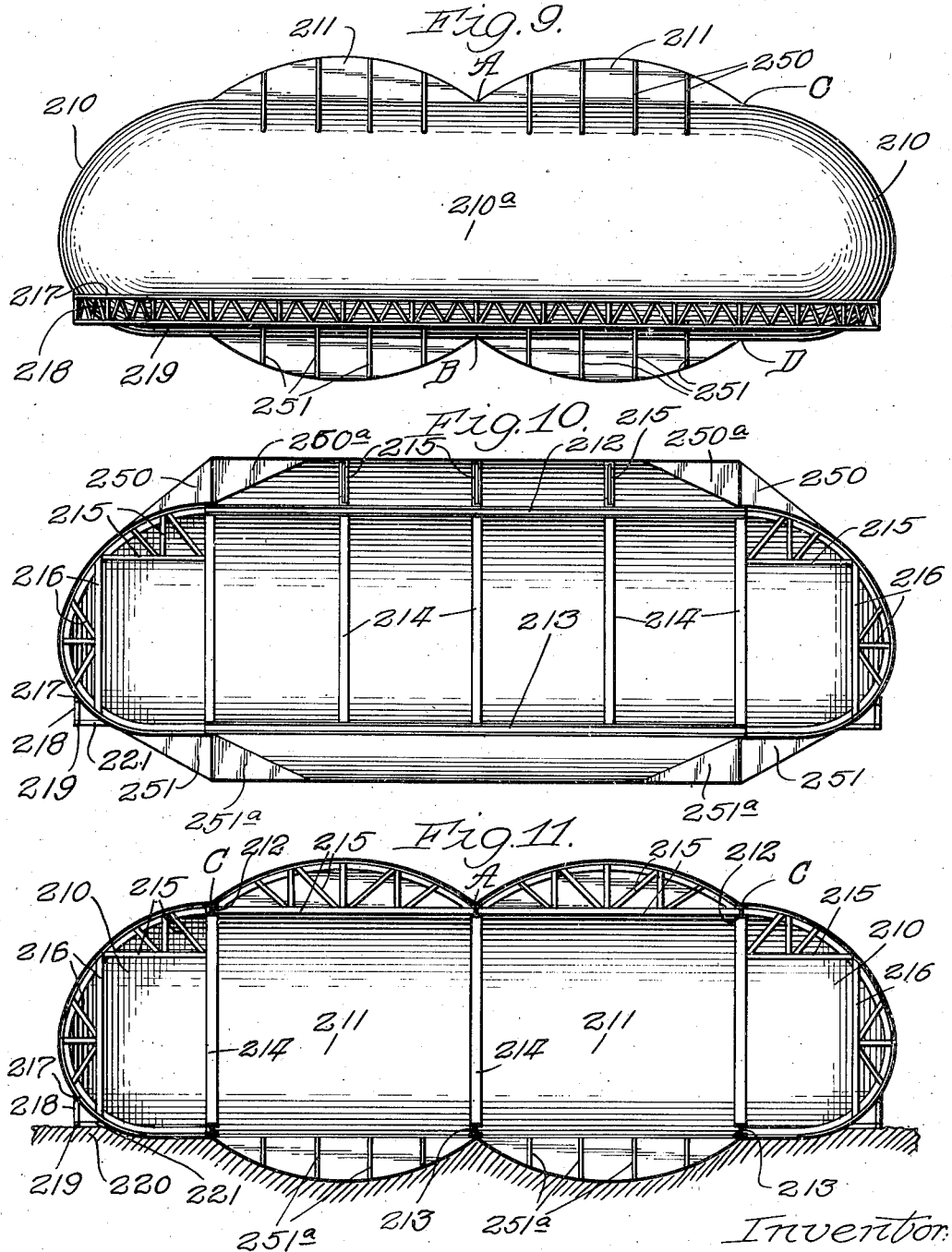

Patented Oct. 12, 1937

2,095,256

UNITED STATES PATENT OFFICE 2,095,256

CONTAINER

George T. Horton, Chicago, Ill.

Application October 5, 1935, Serial No. 43,773

5 Claims. (Cl. 220—1)

This invention relates to improvements in containers and, more especially, a closed container particularly adapted for holding liquids with gas pressure above the liquid. The container will find use, for example, for the storage of volatile liquids like naphtha and gasoline, where it is desired to prevent evaporation losses by holding the gas pressure above the liquid level.

Among the features of my invention is the provision of a closed container for the purposes mentioned that can be relatively cheaply built and which will be strong and efficient in operation.

It is contemplated that the shell of my improved container be made of sheet metal preferably composed of numerous plates of any desired size or shape suitably welded, riveted or bolted together.

Other features and advantages of my invention will appear more fully as I proceed with my specification.

In those forms of devices embodying the features of my invention shown in the accompanying drawings—

Figure 1:
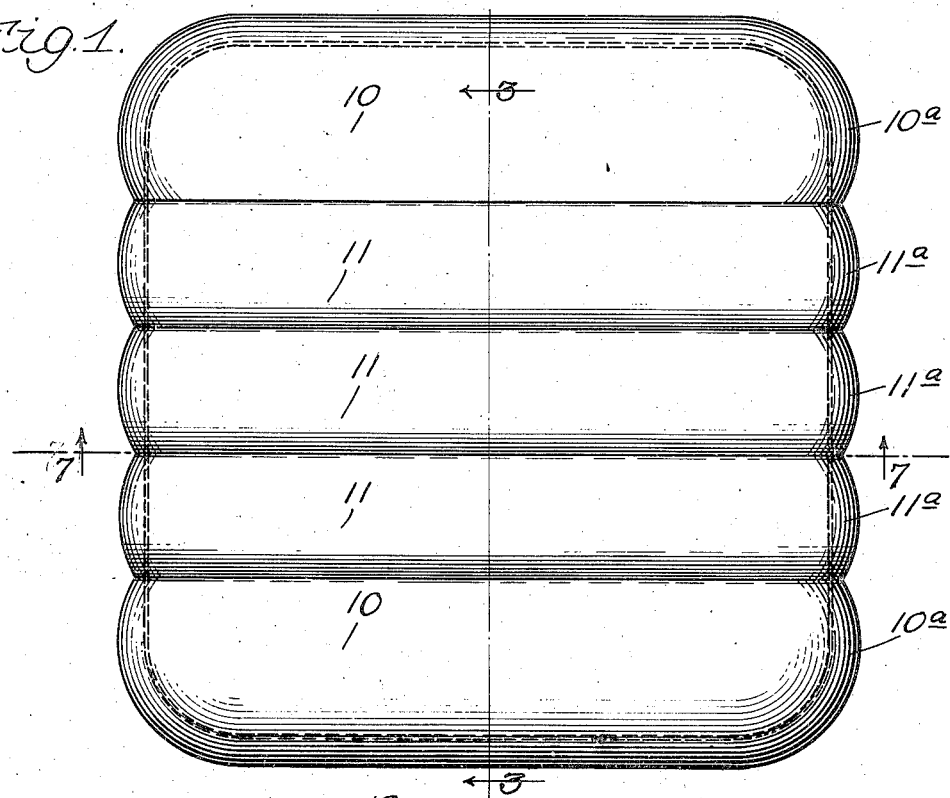
Figure 2:
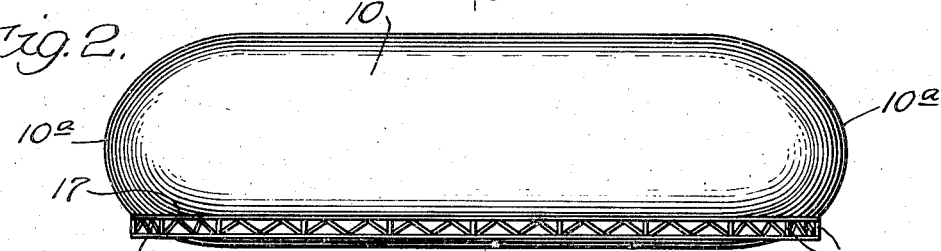
Figure 3:
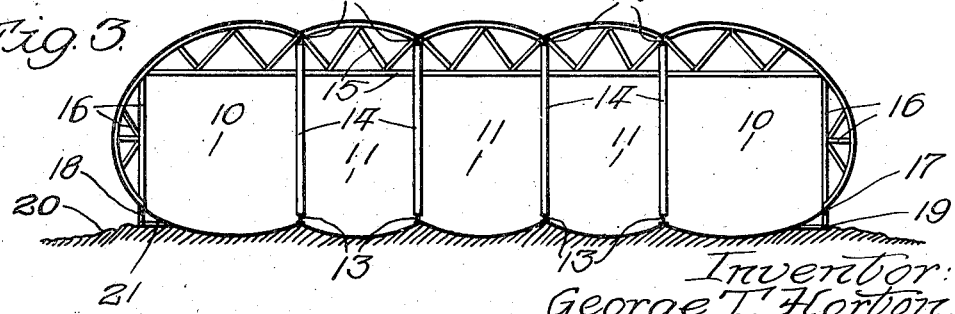

Figure 1 is a top plan view; Fig. 2 is a view in end elevation; Fig. 3 is a view taken as indicated by the line 3 of Fig. 1; Fig. 4 is a view similar to Fig. 1, showing a modification; Fig. 5 is a view taken as indicated by the line 5 of Fig. 4; Fig. 6 is a view taken as indicated by the line 6 of Fig. 4; Fig. 7 is a view taken as indicated by the line 7 of Fig. 1; Fig. 8 is a view similar to Fig. 4 showing a modified form; Fig. 9 is an end view of the same; Fig. 10 is a view taken as indicated by the line 10 of Fig. 8; and Fig. 11 is a view taken as indicated by the line 11 of Fig. 8.

As shown in the drawings, my improved container comprises a plurality of portions, each in the form of a flattened cylindrical section. The tank may include any desired number of such portions, depending upon the size and capacity desired. Each of the portions also may have practically any dimensions or proportions desired, but obviously the different portions of the complete tank must be made to fit together.

In general, it may be stated that each portion of the tank is in the shape of a flattened cylindrical section. The various portions are parallelly arranged so that there are two end sections with any desired number of intermediate sections.

For the purpose of illustrating the invention, I have shown in the drawings a tank including two end portions with three intermediate portions. As shown in the drawings, the end portions are indicated by 10, 10 and the intermediate portions by 11, 11, 11. Each of these portions is substantially in the shape of a flattened cylindrical section with the ends suitably closed. Each of the end portions 10 is a section of a flattened cylinder formed by cutting off one side of the complete flattened cylinder. The intermediate portions 11 are flattened cylindrical sections formed by cutting off two opposite parallel sides of a flattened cylinder.

In the form shown in Figs. 1, 2 and 3, the ends of the sections are closed by outwardly curved plates 10ª, 11ª, respectively. These outwardly curved closures, for example, may be substantially spherical. Inside of the tank at the roof under the lines where the various sections join I provide I-beams 12, 12 and similar I-beams 13, 13 inside of the tank on the bottom. 14, 14 indicate posts connecting the I-beams 12 at the roof with the corresponding I-beams 13 at the bottom. These posts are primarily tension members to brace the structure against internal gas pressures, but obviously they may also serve at times as compression members to aid in supporting the roof against downward movement.

Inside of the tank I prefer to provide horizontal trussing 15 at the roof and also vertical trussing 16 at the sides of the tank.

I also provide outside girders 17 a short distance above the ground level substantially where the bottom of the tank may be said to join the side and the end walls. These girders are supported by vertical and diagonal trussing 18 resting on a girder 19 supported on the ground 20. 21 indicate horizontal members extending from the girder 19 inwardly to the tank to assist in bracing the girder 19.

In Figs. 4, 5 and 6, I have shown a modified form. The structure here shown substantially resembles that shown in Figs. 1, 2 and 3, except that the ends of the various sections are closed by causing the outer sections to form portions of a square-like peripheral flattened cylindrical section extending entirely around the complete container and closing the ends of the intermediate sections.

As shown in Figs. 4, 5 and 6, 110, 110 may indicate end flattened cylindrical sections and 111, 111 and 111 intermediate flattened cylindrical sections corresponding to the sections 10, 10 and 11, 11, 11 of Fig. 1. In the container of Figs. 4, 5 and 6, however, the ends of the section 111 are not closed by outwardly curved plates. Instead of this, the outer sections 110 form portions of a square-like peripheral flattened cylindrical section extending entirely around the container and closing the ends of the intermediate sections 111, 111. This is accomplished by providing the portions 110a, 110a joining the ends of the portions 110, 110 so that the four sections 110, 110a, 110, 110a together constitute a square-like peripheral endless flattened cylindrical section extending entirely around the container.

The container of Figs. 4, 5 and 6 is similarly trussed and braced as the container of Figs. 1, 2 and 3. To this end I provide the roof girders 112 where the sections join and the corresponding floor girders 113 and connect the same by the tension and compression posts 114. Likewise, at the roof I provide the horizontal trussing 115 and the vertical trussing 116 at the sides. Likewise, outside of the container I provide the girder 117 where the bottom and side join, said girder being supported by the trussing 118 on the ground girder 119 resting on the ground 120. The horizontal braces 121 extend from the girder 120 to the wall of the tank substantially at the ground level.

In describing the invention, reference may be made to the following United States patents, namely: No. 1,622,787, Horton, March 29, 1927; No. 1,778,944, Horton, Oct. 21, 1930; No. 1,885,601, Horton, Nov. 1, 1932; No. 1,928,640, Boardman, Oct. 3, 1933; and to the following co-pending patent application, namely: Serial No. 21,886, filed by Clayton L. Day, May 16, 1935. Throughout the specification, I have spoken of flattened cylindrical sections. The end sections 10, 10 of Figs. 1, 2 and 3 and the endless peripheral section, including the portions 110 and 110a of Figs. 4, 5 and 6, preferably have a curvature so that their cross-section resembles the cross-section shown in the above-mentioned Horton and Boardman patents and the cross-section of the outer portion of the tank shown in the above-mentioned Day application. That is, the radii of curvature at successive points on the end sections 10 and 110 and also on the sections 110a from the top down to the bottom in a vertical plane, through lines normal to the shell at such times, are successively shorter. Also, the bottoms of the intermediate sections are preferably not curved quite as much as the tops thereof.

The formula $$r_2 = \frac{T}{P - \frac{T}{r_1}} \text{ or } T = \frac{P}{\left[\frac{1}{r_1} - \frac{1}{r_2}\right]}$$

referred to in Horton patent, No. 1,622,787 and Boardman patent, No. 1,928,640, may theoretically be used in developing the curves for the outer flattened cylindrical sections; but practically no strict adherence to this ideal form is necessary when the internal trussing and bracing and external bracing shown in the drawings is used. In actual use, the loading conditions are frequently not normal, for example, when there is gas pressure but substantially no liquid present, and vice versa. Since internal and external trussing, bracing, framing, tension and compression members, and the like, are preferably employed to take care of the stresses when the load conditions are not normal, it is ordinarily not necessary that the ideal curvature be employed.

In general, and in a broad sense, it may be considered that the present invention is a combination of one or more of the inventions disclosed in one or more of the above-mentioned patents and application, or as an improvement thereon.

In the form of container shown in Fig. 8, the intermediate sections 211 have a larger vertical diameter than the outer sections 210. In this form, however, the outer sections 210 form portions of a square-like peripheral flattened cylindrical section extending entirely around the container and closing the ends of the intermediate sections 211, 211. This is accomplished by providing the portions 210a, 210a joining the ends of the portions 210, 210 so that the four sections 210, 210a, 210, 210a together constitute a square-like peripheral endless flattened cylindrical section extending entirely around the container. The vertical diameter of the sections 211 is preferably made large enough so that the vertical distance between the upper and lower junction lines will be substantially the same as the vertical diameter or height of the section 210. For example, the distance from A to B in Fig. 9 is substantially equal to the vertical height or diameter of the section 210 or the length of the line C—D. This construction will facilitate the drainage of water from the troughs at the top between the sections 211, 211. In the construction shown in Figs. 8 to 11, inclusive, I have shown two intermediate sections. It is obvious, however, that any number may be employed.

In the form shown in Figs. 8 to 11, inclusive, internal bracing similar to that shown in the device of Fig. 4 is employed. For example, roof girders 212 are provided where the sections join. 213 indicate the corresponding floor girders and 214, the tension and compression posts connecting the same. Likewise, at the roof I provide the horizontal trussing 215 and the vertical trussing 216 at the sides. Likewise, at the outside of the container, I provide the girder 217 where the bottom and side join, said girder being supported by the trussing 218 on the ground girder 219 resting on the ground 220. The horizontal braces 221 extend from the girder 219 to the wall of the tank substantially at the ground level.

I also provide triangular plates 250 to brace the ends of the sections 211 where they project above the section 210a and similar plates 251 at the bottom. Likewise, inside I provide triangular braces 250a at the top and 251a at the bottom.

It will be seen that at the roof where the tops of the various sections or portions join such as at 12 in the device of Fig. 3, the curved tops meet at an angle less than 180°.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A closed container including a series of parallel horizontal elongated sections with upwardly curved tops, and bottoms, the curved tops meeting at an angle less than 180°.

2. A container as claimed in claim 1 in which the outer sections form portions of a square-like peripheral section closing the ends of the intermediate sections.

3. A container as claimed in claim 1 in which the outer sections form portions of a square-like peripheral section closing the ends of the intermediate sections and in which the height of the intermediate sections is substantially greater than the height of the outer peripheral section.

4. A container as claimed in claim 1 in which the outer sections form portions of a square-like peripheral section closing the ends of the intermediate sections and in which the height of the intermediate sections is substantially greater than the height of the outer peripheral section and in which the ends of the intermediate sections projecting above the outer peripheral section are braced by external means.

5. A container as claimed in claim 1 in which the outer sections form portions of a square-like peripheral section closing the ends of the intermediate sections and in which the height of the intermediate sections is substantially greater than the height of the outer peripheral section and in which the ends of the intermediate sections projecting above the outer peripheral section are braced by internal means.

GEORGE T. HORTON.